United States Patent [19]
Cox et al.

[11] 3,947,664
[45] Mar. 30, 1976

[54] HIGHLY ACCURATE ODOMETER

[75] Inventors: Percy T. Cox; Herbert A. Rundell, both of Houston, Tex.

[73] Assignee: Texaco Inc., New York, N.Y.

[22] Filed: Jan. 2, 1974

[21] Appl. No.: 430,135

[52] U.S. Cl. .... 235/92 PL; 235/92 DN; 235/92 CC; 235/92 R; 328/48
[51] Int. Cl.² .......................................... G06M 3/14
[58] Field of Search....... 235/92 CC, 92 PL, 92 DN; 328/48

[56] References Cited
UNITED STATES PATENTS

| | | | |
|---|---|---|---|
| 3,209,130 | 9/1965 | Schmidt | 235/92 PL |
| 3,549,870 | 12/1970 | Lay | 235/92 PL |
| 3,571,575 | 3/1971 | Barr | 235/92 PL |
| 3,719,807 | 3/1973 | Daley | 235/92 PL |
| 3,845,281 | 10/1974 | Konisi et al. | 235/92 PL |
| 3,864,552 | 2/1975 | Phillips | 235/92 PL |

*Primary Examiner*—Joseph M. Thesz, Jr.
*Attorney, Agent, or Firm*—T. H. Whaley; C. G. Ries; Henry C. Dearborn

[57] ABSTRACT

An odometer that employs a pulse generator, the pulses of which correspond to a given increment of linear distance. It has a correction circuit which may be set to either add or subtract a pulse after a predetermined number of pulses have been counted. This corrects the linear distance measured for any cumulated total. Consequently, inaccuracies in the dimension represented by each pulse will be periodically compensated for by the added or deleted pulse.

3 Claims, 6 Drawing Figures

HIGHLY ACCURATE ODOMETER

BACKGROUND OF THE INVENTION

1. Field of the Invention

This invention concerns odometers in general. More specifically, it provides for a highly accurate odometer system, such that cumulative errors may be eliminated.

2. Description of the Prior Art

Heretofore, it had been difficult to manufacture an odometer system which is sufficiently accurate to avoid accumulating substantial errors where extremely lengthy linear measurements are involved. For example, in certain oil-well-drilling procedures in which linear distance is to be measured along the drill string, the measurement should be extremely accurate. This is especially so when any error is considered relative to the total depth of modern deep wells. The conventional linear measurement in such case is made from revolutions of the derrick sheave, and the sheave or other odometer wheel employed, invariably has manufacturing tolerances which result in a discrepancy when taken with practically any unit of linear measurement. Such discrepancy may be either positive or negative. But in either case, taken over the great distances involved in deep-well operations, it will accumulate a substantial and undesirable error.

Thus, it is an object of this invention to provide means for periodically making a unit correction, in order to counteract the above-indicated manufacturing error.

SUMMARY OF THE INVENTION

Briefly, the invention concerns a highly accurate odometer which comprises means for measuring a predetermined linear distance repeatedly, and means for producing a signal corresponding to each said distance measurements. It also comprises means for continually counting the total number of said signals, and means for algebraically changing said total count repeatedly after each of a predetermined subtotal count in order to correct said odometer measurement with a desired degree of accuracy.

Again, briefly, the invention concerns an odometer for accurately measuring long linear lengths. It comprises in combination a wheel driving an electric pulse generator. The said pulse generator produces a first predetermined number of pulses for each predetermined amount of said wheel rotation. The wheel rotation measures a predetermined increment of said linear length, depending upon the circumference of the wheel. The invention also comprises a pulse shaper, and a total pulse counter for indicating said long linear length. In addition, it comprises a subtotal pulse counter for determining when a second predetermined number of pulses has been reached, and means for comparing a present count representing said second predetermined number of pulses with said subtotal pulse counter. It also comprises a NAND gate for passing a pulse when said present count has been reached by said subtotal counter, and a selector switch in the input of said total pulse counter. Also, it comprises an add channel for introducing an extra pulse. The add channel comprises a time-delay circuit for delaying said NAND gate pulse at least the width of one of said shaped pulses, and a pulse regenerator. The add channel also comprises an OR gate for passing said total number of shaped pulses in addition to said regenerated pulse to an add side of said selector switch. In addition, it comprises a subtract channel for removing a pulse. The substract channel comprises a delay and regeneration means connected to the output of said pulse shaper, as well as an inhibit signal flip-flop having an input connected to receive said NAND gate pulse, and an inhibit OR gate for passing said delay and regeneration means output to a subtract side of said selector switch, except when said inhibit signal is present.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

Figure 1:
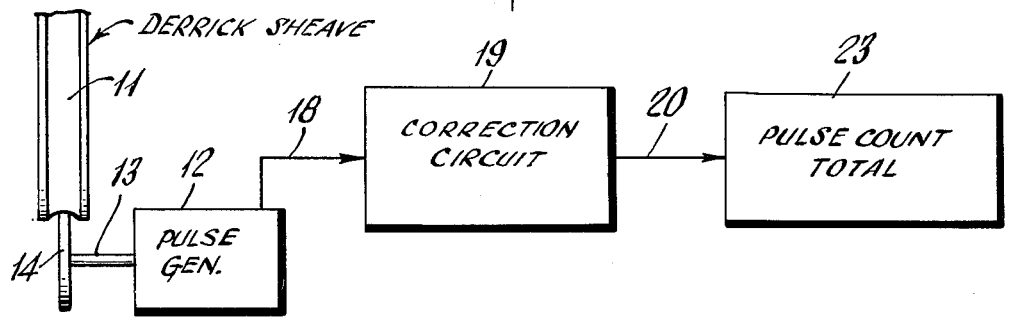
FIG. 1 is a schematic block diagram illustrating in general the elements of a system according to the invention.

FIG. 1 illustrate an application of the invention to oil-well drilling, i.e., where the linear distance that a drill string penetrates in a borehole, is to be measured. It will be understood that the drill string is supported from a derrick (not shown) by pulleys and a cable (not shown). The pulleys include a sheave 11 that is supported on the derrick, as indicated by the caption, and the cable (not shown) travels over the pulley sheave 11 in supporting the drill string. Thus, the rotation of the derrick sheave, or wheel 11 is a direct measurement of linear units related to the diameter of the wheel, and which may be translated into the vertical displacement of the drill string. Consequently, such vertical distance may be measured from the wheel (sheave) rotation.

Thus, in FIG. 1, there is shown a portion of the derrick sheave, or wheel 11, and the amount of rotation thereof is, in turn, measured by a pulse generator 12. The generator has an input shaft 13 on which there is fixed for rotation therewith at all times, a wheel 14 which, in turn, is in frictional (non-slip) contact with the peripheral surface of the wheel 11.

It will be appreciated by anyone skilled in the art that by this arrangement the pulse generator 12 may be designed so as to provide an electrical pulse-type signal for each revolution or portion thereof, as desired. Of course, the relative sizes of the diameters or circumferences of wheels 11 and 14 will determine the number of pulses generated for each rotation of wheel 11. The pulses thus generated are transmitted over a circuit connection 18 that leads into a correction circuit 19. The pulses then pass through the correction circuit 19 and are transmitted via a circuit connection 20 to a total pulse counter 23.

It will be appreciated that the pulse generator 12 might take various forms so long as an electrical pulse will be produced for each predetermined amount of rotation of the shaft 13. Preferably, generator 12 is a bidirectional generator which produces two square waves per revolution, which pulses are phased at 90° of rotation.

Similarly, the total pulse counter 23 might take various forms, and there are many conventional electronic counters that would be feasible.

In order to illustrate the principles of this invention, reference may be had to the following illustrative example. Thus, if the wheel 11 should have a size such that there are five linear units every revolution, and if the measurement were desired in one-tenth units, then a pulse generator with its wheel 14 would be designed so as to produce fifty pulses per revolution. However, if after constructing such equipment it was found that the wheel 11 was 5.05 linear units in circumference every two revolutions (i.e., 10 units or 100 counts), 10.1 units would have been actually measured by the pulse counter. But, only one hundred counts would have been produced. However, by providing a correction circuit according to this invention, an added pulse would be generated following every one-hundredth pulse from the generator. Therefore, the total count would be accurate, as desired.

Figure 3:
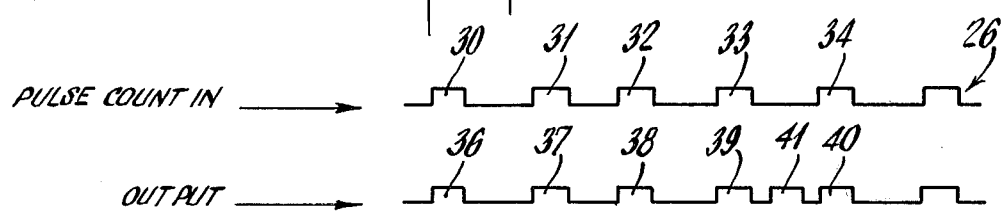

The same basic principle is illustrated in FIG. 3. Thus, if a series of pulses 26 are being generated, e.g. by generator 12 (FIG. 1), and it is desired to add an extra pulse after every four pulses, then the generated pulses 30, 31, 32, 33, 34, etc., will be going into the correction circuit 19 (FIG. 1) (as indicated by the caption in FIG. 3), while corresponding pulses 36, 37, 38, 39 and 40 will be coming out, plus an additional pulse 41 in between pulses 39 and 40, i.e., after the fourth pulse.

Figure 2:
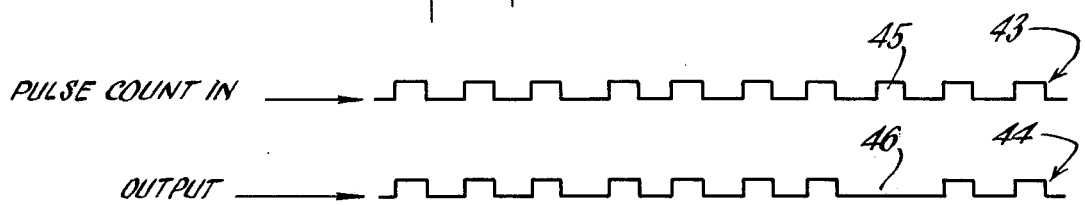
FIGS. 2 and 3 are signal pulse diagrams illustrative of the manner in which a total count is corrected.

On the other hand, if it is desired to eliminate a pulse, for example, after every seventh pulse, then the conditions are illustrated in FIG. 2. Here, a series of pulses 43 are being generated and going into the correction circuit 19 (FIG. 1), while a corresponding series of pulses 44 will be coming out, both as indicated by the captions in FIG. 2. However, the eighth input pulse 45 will be inhibited, as indicated by a space 46 in the series of pulses 44.

It will be noted from the foregoing that the invention applies algebraically. In other words, it may be set so as to either add or subtract a count after a predetermined number of counts has been reached. In addition, it should be pointed out that the spacing between pulses is intentionally illustrated as being non-uniform, because the rate need not be constant. It is the amount of rotation of the pulse generator that determines when each pulse is generated following the preceding one.

It may be noted that in practice the accuracy is such as to require a large number of pulse counts before making a correction. Therefore, as will appear in the more detailed description hereafter, a subtotal count capacity of three decimal digits is employed.

Figure 4:
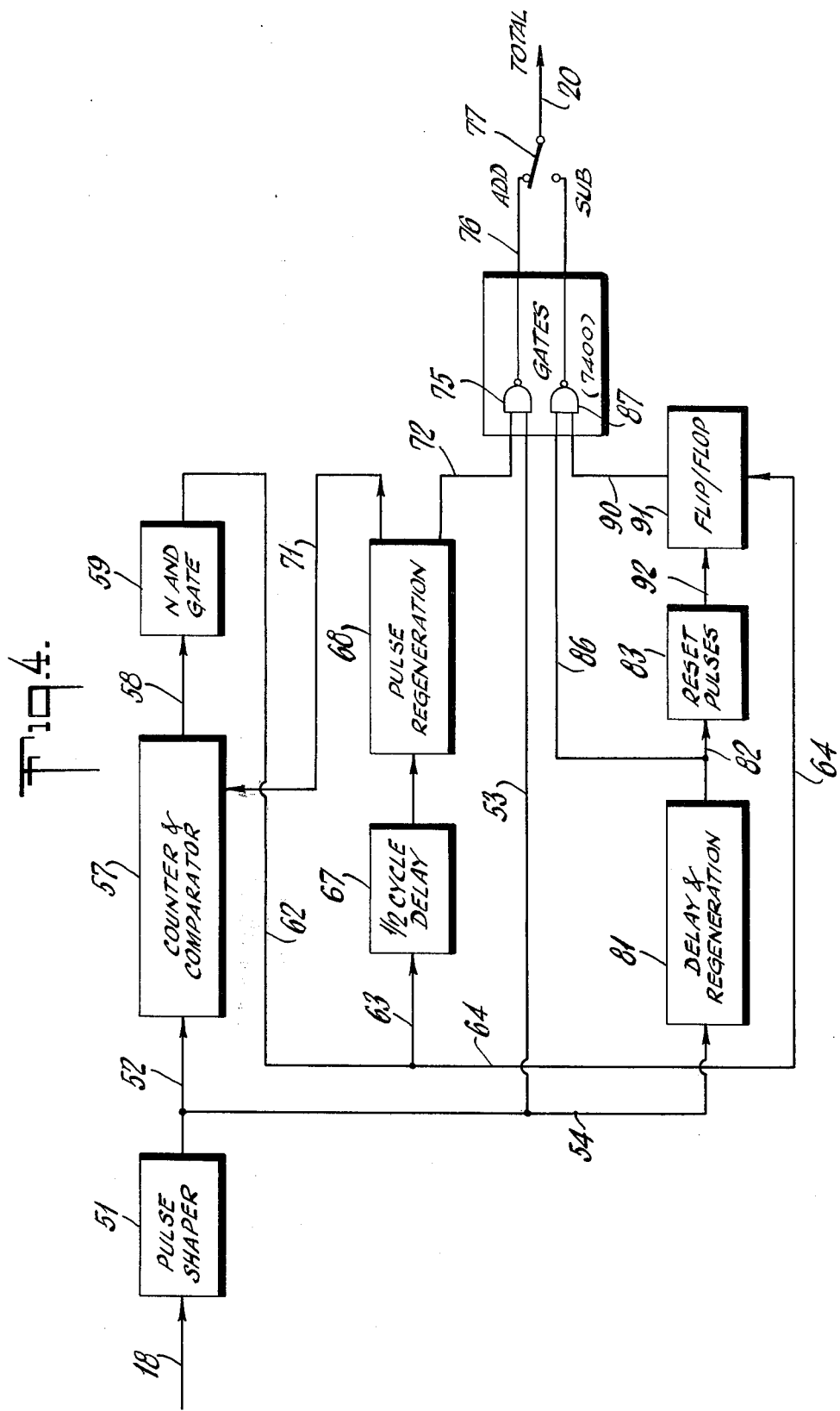
FIG. 4 is a block diagram illustrating the functional elements that are included in the correction circuit shown in FIG. 1.

FIG. 4 is a block diagram that illustrates the different functional elements which make up the correction circuit 19 of FIG. 1. Thus, in FIG. 4, the circuit connection 18 goes to a pulse shaper 51, and the output therefrom goes over three parallel connections 52, 53 and 54.

Connection 52 goes to the input of a counter and comparator 57, which unit has an output via a connection 58 to a NAND gate 59. The NAND gate 59 has an output which goes via a connection 62 to two parallel input circuits via circuit connections 63 and 64.

The connection 63 is an input for a half-cycle delay element 67 that has the output thereof connected to the input of a pulse regeneration circuit 68. There are two outputs from regeneration circuit 68 via connections 71 and 72. The former leads back to the counter and comparator 57, while connection 72 leads to an input of a gate 75. It may be noted here that the connection 53 leads to another input of the gate 75. This is an OR gate so that when either of the signals is present, there will be a pulse passed through over a connection 76 which goes to the "add" side of a selector switch 77. If this switch is in the illustrated position, pulses appearing on connection 76 will be transmitted via the output connection 20 to the counter 23 (FIG. 1) which makes a total pulse count.

The other input circuit connection 64 leads to an element of the subtraction channel. The elements for subtracting a pulse include a delay and regeneration unit 81 that has the output connection 54 connected to the input thereof. The output of unit 81 is connected via a connection 82 to a "RESET PULSES" unit 83, while a parallel connection 86 goes to an input of another gate 87. The other input to the gate 87 goes via a connection 90 from a flip-flop unit 91 that has one input over the connection 64 and the other input via a connection 92 from the unit 83 which supplies reset pulses.

OPERATION OF FIG. 4

While a more detailed circuit showing will be made hereafter in connection with FIGS. 5 and 6, the functional operation of the correction circuit may be followed with reference to FIG. 4. Electrical pulses are introduced over the input circuit connection 18 from the pulse generator 12 (FIG. 1). They are shaped in the pulse shaper 51 for purposes of handling in the rest of the electrical circuitry.

Shaped pulses are sent to the counter and comparator 57 where, by a manual preset (to be described more fully below), the number of pulses to be counted is determined. When that number is reached, a pulse is passed over the connection 58 and through the NAND gate 59. This pulse continues over the connection 62 to the parallel input circuits 63 and 64. It is a control pulse that acts in both the "add" and the "subtract" channels; and the channel that is effective at the correction circuit output connection 20 is determined by the position of the selector switch 77.

When the correction pulse is to be added, the selector switch 77 will be in the position illustrated. Then the shaped pulses out from shaper 51 will be passed over circuit connection 53 to the OR gate 75 and on via connection 76 and the switch 77 to output connection 20 that leads to the total pulse counter 23 (FIG. 1). Also, each time the subtotal number of pulses has been reached, the foregoing control pulse (which goes over the input circuit 63) is delayed a half-cycle in unit 67 and regenerated in circuit 68. The regenerated pulse then goes over connection 72 to the OR gate 75 and on as did the shaped pulses from shaper 51. Consequently, the additional correction pulse is added after each subtotal number of pulses.

The circuit connection 71 merely carries a reset pulse back to the counter and comparator 57 in order to start over with the next subtotal count.

On the other hand, if the correction to be made is subtracted of a pulse instead of addition of one, the selector switch 77 will be in the opposite position. Then the shaped pulses out from shaper 51 which are passing over the circuit connection 54 will go into the delay and regeneration circuit 81. These delayed and regenerated pulses will go over connection 86 into one input of the inhibit OR gate 87. Until the above-described control pulse is generated, these pulses go on to the total pulse counter via the circuit connection 20.

When the control pulse appears, it goes over the input circuit 64 to the flip-flop 91 and flips it to the opposite state. That applies an inhibit signal over the connection 90 so that the gate 87 inhibits the next pulse and, consequently, the total number of pulses has one subtracted. It should be noted that the control pulse is developed from a shaped pulse out of shaper 51 so that it will have flipped the flip-flop 91 before a corresponding pulse out from the delay and regeneration circuit 81 appears at the gate 87.

At the end of each of the pulses from citcuit 81, there are reset pulses generated in unit 83, including one applied over connection 92 to the flip-flop 91 so that it tends to be returned continuously, and all of the subtotal number of pulses will be passed through.

The details of how the correction circuit 19 operates will be made clear with reference to FIGS. 5 and 6, which illustrate in greater detail the electronic circuits that are employed in conjunction with integrated circuit elements, such elements being commercially available.

CORRECTION CIRCUIT — DETAIL

Figure 5:
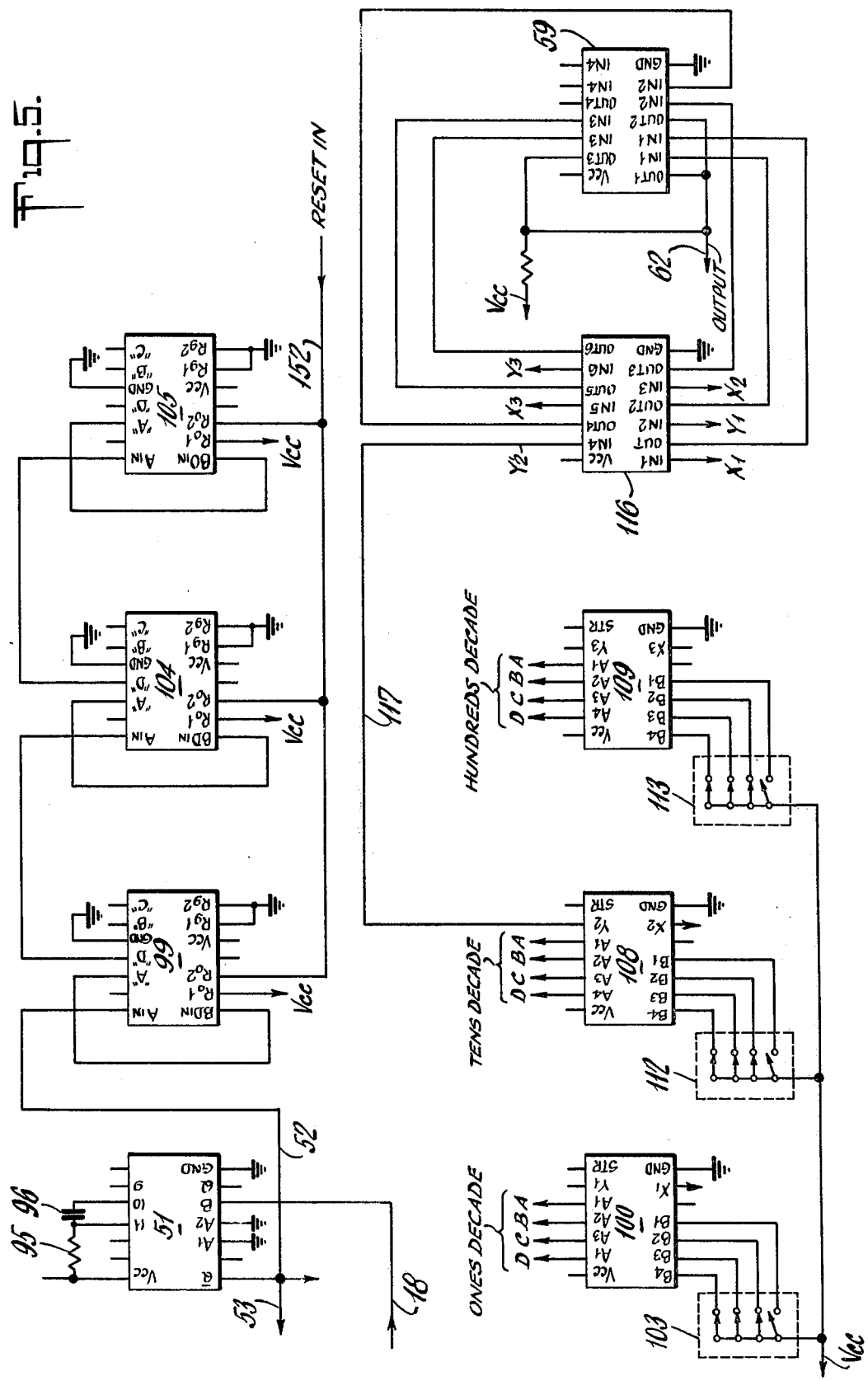
FIGS. 5 and 6 together illustrate the details of an electronic circuit that is in accordance with the block diagram of FIG. 4.
Figure 6:
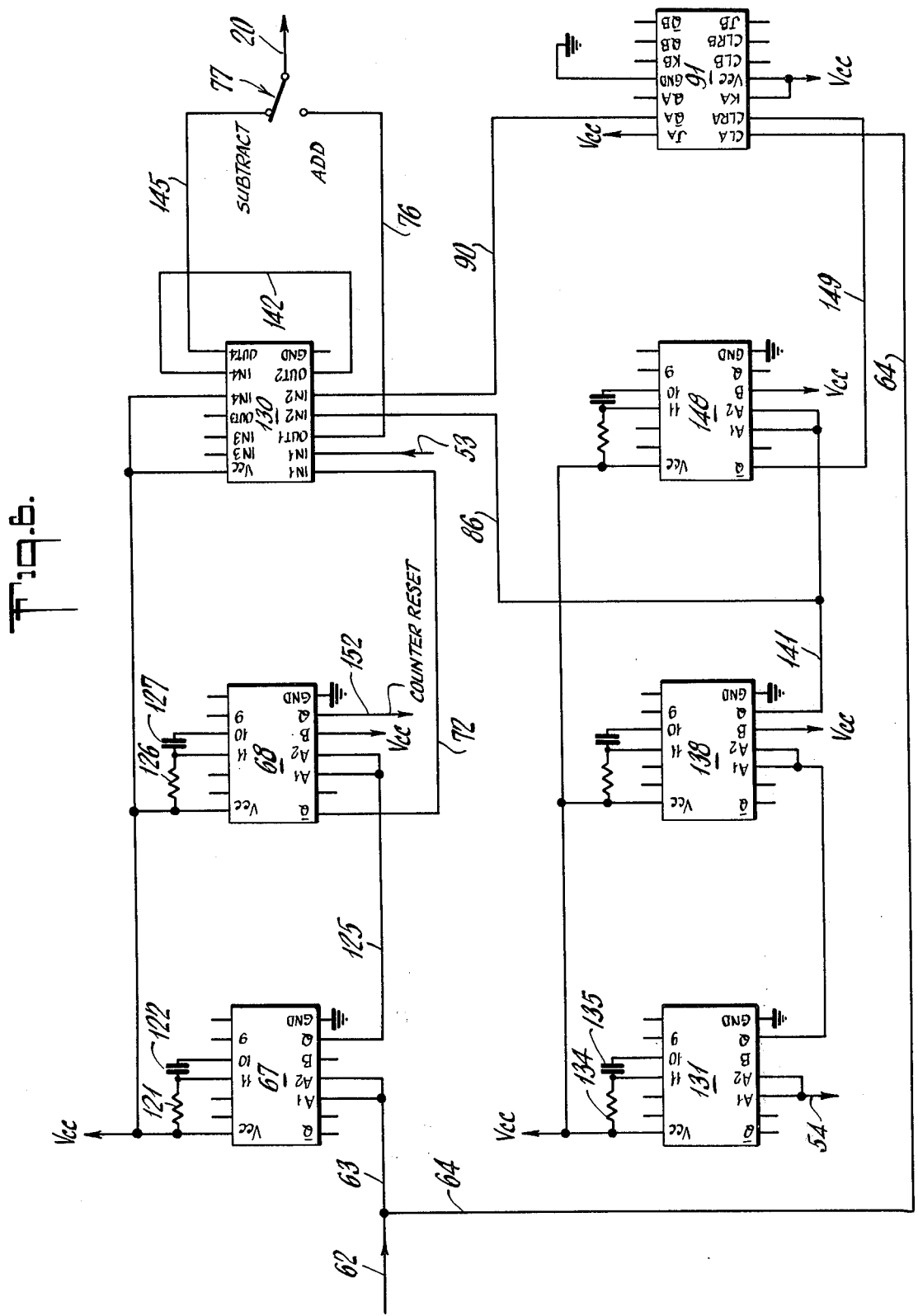

FIGS. 5 and 6 illustrate the details of electronic circuitry that may be employed in carrying out the general function of the correction circuit, which general functions were described above in connection with FIG. 4. Thus, the input circuit connection 18 is shown in FIG. 5 while the output circuit connection 20 is shown in FIG. 6. Other circuits of FIGS. 5 and 6 do not necessarily have a counterpart in FIG. 4, but wherever corresponding circuit connections exist the same reference numbers will be applied.

It will be appreciated by anyone skilled in the art that the circuits illustrated in FIGS. 5 and 6 make use of integrated circuit units that are represented by rectangles. The conventional notations employed indicate the type of signal, if any, that is applied to the various terminals, fourteen in number, that have internal connections or not, depending upon the type of integrated circuiut it is. The internal connections are indicated by the various manufacturers, both in block-diagram form (functional) and in electrical schematic form, for use in designing overall circuits. Consequently, such details need not be specifically illustrated here.

Referring to FIG. 5, it will be observed that the input circuit 18 goes to the pulse shaper 51 at a terminal marked B. This integrated circuit unit (51) is a monostable multivibrator that shapes the pulses generated by the generator 12 (FIG. 1), to be square-wave shape and of uniform width. The characteristics are determined by an external resistor 95 and capacitor 96, in conjunction with the voltage applied to the terminal marked Vcc. It will be understood that throughout both FIGS. 5 and 6, all terminals marked Vcc have a common DC voltage applied whether or not a common circuit connection is illustrated. Where the common circuit is omitted it is for clarity.

The output connections 52, 53 and 54 are parallel branches from the output terminal marked Q of pulse shaper 51. Consequently, shaped pulses are continuously applied to all three circuits.

Connection 52 goes to a first decade counter 99 which has a caparator 100 connected to the binary internal circuits thereof, as indicated by the four circuit connections marked D, C, B and A, which have the caption "ONES DECADE" adjacent to the comparator 100. The comparator is manually set for providing output signals at terminals marked $X_1$ and $Y_1$, when a predetermined decimal count is reached by the counter 99. This manual setting is made by adjusting a multiple switch 103 to close binary circuits corresponding to the decimal number in a well-known manner. A commercially available thumb-wheel type of switch structure (not shown) may be employed which indicates the decimal number that corresponds to the binary setting. It will be appreciated that the four switches in multiple switch 103 represent the four powers of two, i.e., zero, first, second and third, in vertically descending position as illustrated. Thus, the decimal number illustrated by the setting shown in seven.

There are two more decade counters 104 and 105 that are connected in series to the output of the first, or "Ones" decade counter 99. Each of these counters has a corresponding comparator 108 and 109, respectively, and each is individually set for providing output signals at terminals marked $X_2$, $Y_2$ and $X_3$, $Y_3$, respectively, all in the manner indicated above regarding comparator 100. A multiple switch 112 is connected to the comparator 108, while another multiple switch 113 is connected to comparator 109. It may be noted that the decimal number setting illustrated is again seven in each case so that the total number to be compared with the counter is seven-hundred-and-seventy-seven. It will be understood that the set number might be anything desired from one to nine-hundred-and-ninety-nine, as determined by the settings of the thumbwheel switches 103, 112, and 113.

The output signals from the comparators 100, 108 and 109 all go to an inverter 116 in the manner indicated by the terminal markings. This is illustrated by only one completed connection 117 which goes from output terminal $Y_2$ of comparator 108 to input number four (marked IN 4) of the inverter 116. Outputs from the inverter 116 go to an integrated circuit unit 59 in the manner indicated. This unit 59 acts as a NAND gate, as was indicated in connection with FIG. 4, and whenever there is a total coincidence between the three decade counters 99, 104, 105 and the corresponding numbers set in the comparators 100, 108 and 109, there will be an output pulse on the circuit connection 62 which has the caption "OUTPUT" in FIG. 5.

Now referring to FIG. 6, it will be observed that connection 62 divides into the parallel connections 63 and 64 in the manner already indicated in connection with FIG. 4. Thus, connection 63 leads into the one-half cycle delay element 67 which is a monostable multivibrator having an external resistor 121 and a capacitor 122, which have the necessary values to make the delay at least as long as the width of a pulse coming from the pulse shaper 51 (FIGS. 4 and 5). Then a signal at the end of the delay goes over a connection 125 to the pulse regeneration circuits 68 which is another monostable multivibrator. This one has an external resistor 126 and capacitor 127 that are designed to generate a pulse of the same width as the shaped pulses generated by the shaper 51.

The output of the regenerator 68 goes over the connection 72 to one of two OR gate inputs of a plural-gate integrated circuit 130, the other input being connection 53 which was mentioned above. It should be noted that the reference to OR gates may include NOR gates, but the sense of the description will be clear to one skilled in the art. The output of this OR gate is connected over the add-channel connection 76 to a terminal of the selector switch 77 (shown with terminals reversed vis-a-vis FIG. 4), so that all of the shaped pulses from shaper 51 are passed to this terminal, in addition to an extra pulse at the end of the preset counted number of pulses. The extra pulse appears in between the last of the subtotal counted number and the next pulse, which is the first of the next succeeding subtotal count.

The other parallel connection 64 leads to an input of the flip-flop 91. This is one-half of an integrated circuit of the type known as a "dual J-K master-slave flip-flop", and when the pulse appears on circuit connection 64 from connection 62, it will flip the flip-flop and so produce an output signal on the circuit connection 90, which goes to one of the inputs of the integrated circuit 130 where it inhibits the next signal from the companion input circuit 86.

Before the inhibit signal from flip-flop 91 appears, the shaped pulses from shaper 51 (FIG. 5) are going over the third parallel circuit connection 54 to a delay unit 131 that is another monostable multivibrator which has an external resistor 134 and capacitor 135. This delays the shaped pulses so that after they are regenerated in another integrated circuit 138, they go over a circuit connection 141 to the connection 86. Consequently, until the subtotal count of pulses has been reached, they are all being delayed a predetermined amount and transmitted along the subtract channel after regeneration. The path includes connections 141 and 86 leading into the integrated circuit 130. Then it goes out and in over a circuit connection 142 in order to invert the pulses which go out over a circuit connection 145 that leads to one terminal of the selector switch 77. It will be observed that in FIG. 6 the selector switch 77 is illustrated in the subtract-channel position.

Necessary reset pulses are generated from the regenerated pulses in the subtract channel, i.e., from the output of integrated circuit 138, by having another monostable multivibrator unit 148 which has an output connection 149. This reset returns the flip-flop 91 to its original state after each time it has been flipped to inhibit a pulse in the subtract channel.

Similarly, there is a reset pulse developed by the regenerator 68 that goes to the counters 99, 104 and 105 over a circuit connection 152. This resets all counters after each subtotal count has been reached, and following the foregoing action in the add and subtract channels. In the former, an additional pulse is inserted, while in the latter a pulse is inhibited. The result, of course, affects the total count transmitted over connection 20 in the alternative, depending upon the state of the selector switch 77.

While the invention has been described above in considerable detail in accordance with the applicable statutes, this is not to be taken as in any way limiting the invention, but merely as being descriptive thereof.

We claim:

1. An odometer for accurately measuring long linear lengths, comprising in combination a wheel driving an electric pulse generator, said pulse generator producing a first predetermined number of pulses for each predetermined amount of said wheel rotation, said wheel rotation measuring a predetermined increment of said linear length depending upon the circumference thereof, a pulse shaper, a total pulse counter for indicating said long linear length, a subtotal pulse counter for determining when a second predetermined number of pulses has been reached, means for comparing a preset count representing said second predetermined number of pulses with said subtotal pulse counter, a NAND gate for passing a pulse when said preset count has been reached by said subtotal counter, a selector switch in the input of said total pulse counter, an add channel for introducing an extra pulse, comprising a time-delay circuit for delaying said NAND gate pulse at least the width of one of said shaped pulses, a pulse regenerator, and an OR gate for passing said total number of shaped pulses in addition to said regenerated pulse to an add side of said selector switch, and a subtract channel for removing a pulse, comprising a delay and regeneration means connected to the output of said pulse shaper, an inhibit signal flip-flop having an input connected to receive said NAND gate pulse, and an inhibit OR gate for passing said delay and regeneration means output to a subtract side of said selector switch, except when said inhibit signal is present.

2. A highly accurate odometer, comprising means for measuring a predetermined linear distance repeatedly, an electric pulse generator for producing a signal corresponding to each said distance measurement, an electronic counter for continuously counting the total number of said signals, means for determining when a predetermined subtotal count has been reached comprising a second electronic counter, means for algebraically changing the total count by one, switch means for selecting whether said change count is added or substracted, a pulse shaper having an input connected to said pulse generator and plurality of output circuits, a pair of gates having the outputs thereof connected to said switch means, one of said pulse shaper output circuits being connected to said subtotal counter means, another of said pulse shaper output circuits being connected to one of said gates, and a third of said pulse shaper output circuits being connected to the other of said gates.

3. An odometer according to claim 2, further including delay and regeneration means connected in series with said third pulse shaper output circuit whereby said continuous electronic counter receives said pulses with a predetermined delay except when a pulse is inhibitied after said subtotal count has been reached.

* * * * *